(12) United States Patent
Pignol

(10) Patent No.: US 6,839,868 B1
(45) Date of Patent: Jan. 4, 2005

(54) METHOD FOR PROCESSING AN ELECTRONIC SYSTEM SUBJECTED TO TRANSIENT ERROR CONSTRAINTS AND MEMORY ACCESS MONITORING DEVICE

(75) Inventor: Michel Pignol, Toulouse (FR)

(73) Assignee: Centre National d'Etudes Spatiales, Paris (FR)

( * ) Notice: Subject to any disclaimer, the term of this patent is extended or adjusted under 35 U.S.C. 154(b) by 0 days.

(21) Appl. No.: 09/807,077

(22) PCT Filed: Oct. 11, 1999

(86) PCT No.: PCT/FR99/02430
§ 371 (c)(1),
(2), (4) Date: Apr. 9, 2001

(87) PCT Pub. No.: WO00/22529
PCT Pub. Date: Apr. 20, 2000

(30) Foreign Application Priority Data
Oct. 12, 1998 (FR) .......................... 98 12745

(51) Int. Cl.[7] .............................................. G06F 11/00
(52) U.S. Cl. ......................................................... 714/42
(58) Field of Search .............................. 714/42, 47, 52, 714/54, 39, 25, 27; 713/200, 201, 202

(56) References Cited

U.S. PATENT DOCUMENTS

| | | | | |
|---|---|---|---|---|
| 4,375,664 A | * | 3/1983 | Kim ............................. | 714/52 |
| 5,434,999 A | * | 7/1995 | Goire et al. .................. | 717/167 |
| 5,485,577 A | * | 1/1996 | Eyer et al. ................... | 713/202 |
| 5,504,814 A | * | 4/1996 | Miyahara ..................... | 713/200 |
| 5,590,277 A | * | 12/1996 | Fuchs et al. .................. | 714/38 |
| 5,596,739 A | * | 1/1997 | Kane et al. ................... | 711/152 |
| 5,845,331 A | * | 12/1998 | Carter et al. ................. | 711/163 |
| 5,948,112 A | * | 9/1999 | Shimada et al. .............. | 714/16 |
| 5,963,191 A | * | 10/1999 | Jaaskelainen, Jr. ........... | 345/856 |
| 6,003,123 A | * | 12/1999 | Carter et al. ................. | 711/207 |
| 6,158,025 A | * | 12/2000 | Brisse et al. ................. | 714/48 |
| 6,202,154 B1 | * | 3/2001 | Suzuki et al. ................ | 713/200 |
| 6,212,635 B1 | * | 4/2001 | Reardon ...................... | 713/165 |

FOREIGN PATENT DOCUMENTS

| | | |
|---|---|---|
| EP | 0133004 | 2/1985 |
| EP | 0813152 | 12/1997 |

OTHER PUBLICATIONS

Furht, B., et al., "A Survey of Microprocessor Architectures for Memory Management," vol 20, No. 3, 19 pages.

Sosnowski, "Transient Fault Tolerance in Digital Systems", 12 pages.

Mahmood, et al., "Concurrent Error Detection Using Watch-dog Processors—A survey", 15 pages.

* cited by examiner

Primary Examiner—Nadeem Iqbal
(74) Attorney, Agent, or Firm—Thelen Reid & Priest LLP

(57) ABSTRACT

This invention relates to a processing procedure for an electronic system subject to transient error constraints, in which two virtual sequences installed on a single physical sequence are multiplexed in time in one given real time cycle (the data resulting from each execution of a virtual sequence being stored so that they can be voted before use), and in which if an error is detected, the real time cycle in progress is inhibited and a healthy context is reloaded to make a restart that consists of a nominal execution of the next cycle starting from the reloaded context.

This invention also relates to a memory access monitoring device.

19 Claims, 9 Drawing Sheets

METHOD FOR PROCESSING AN ELECTRONIC SYSTEM SUBJECTED TO TRANSIENT ERROR CONSTRAINTS AND MEMORY ACCESS MONITORING DEVICE

This application is a national phase of PCT/FR99/02430 which was filed on Oct. 11, 1999, and was not published in English.

TECHNICAL FIELD

The invention relates to a processing procedure for an electronic system subject to transient error constraints and a memory access monitoring device, for example for use in space.

STATE OF PRIOR ART

The process according to the invention relates to tall computer architectures subject to transient errors.

For example, the following fields use computers subject to disturbing environments for electronic components (radiation, electromagnetic disturbances) that could generate this type of error:

space, nuclear and aeronautical industries, in which the environment includes heavy ions, automobiles, subject to a severe electromagnetic environment.

The space industry is used as an example throughout the rest of the description, because it is very representative of random transient errors generated on electronic components, and because this is the field in which the process according to the invention was initially developed and evaluated.

Designers of computer architectures for satellites are faced with the problem of radiation that exists in space but that is filtered by the earth's atmosphere. This radiation may have a "singular event" effect that causes temporary state changes of bits in memory components, in internal registers of microprocessors or in other integrated components. For example, errors generated by these singular events may generate incorrect data, for example a bad control of a satellite actuator or a serious disturbance to the software sequence, for example by crashing a microprocessor.

Up to now, the solution for singular event type errors was to use integrated circuit technologies referred to as "radiation tolerant" technologies that were not very sensitive to this phenomenon, or "radiation hardened" technologies that are insensitive to it. This type of technology that is not used in industrial microelectronics was developed specifically for military and space applications.

The global cost associated with the existence of these microelectronic technologies and the development of components using these technologies, and therefore the selling cost of these components, is very high. The ratio of the cost between a hardened circuit and a commercial circuit may be 100 or more.

The market share of "high reliability" military components has dropped sharply from 80% in the 1960s to less than 1% in 1995. Starting from 1994, the American Department of Defence reduced the use of military electronic components for its applications and accelerated the process of increased use of commercial specifications/standards/components for military activities.

As described in document ref. [1] at the end of this description, the use of commercial electronic components has become a challenge that the space industry needs to face.

The use of commercial components in space applications is a problem that all new generation projects face. A major problem to be solved is then the sensitivity of these components to radiation, and particularly to heavy ions; this aspect which was previously treated at "component" level, then needs to be solved at the "architecture" and "system" levels. As described in the two documents reference [2] and [3], the satellites and therefore their onboard electronics are subjected to a radiation environment composed of different particles (electrons, heavy ions, protons), that are not applied to systems on the ground since these particles are filtered by the atmosphere.

These particles may be due to:

cosmic radiation originating partly outside the galaxy, and partly within the galaxy composed of extremely high energy ions, radiation belts composed of trapped electrons and protons generated subsequent to interactions between the earth's atmosphere and solar particles, solar eruptions that emit protons or heavy ions, the solar wind generated by the evaporation of coronal plasma, allowing low energy protons and ions to escape from the gravitation pull of the sun.

These high energy particles strike and pass through an electronic component, and transfer part of their energy to it and thus disturb its normal operation. These problems are called "singular events" created by heavy ions and protons.

These singular events correspond to the generation of errors in cells that memorize binary values, and cause bit errors. As a general rule, a single bit is modified by a heavy ion. These events are not destructive and new data can be written afterwards; the new data are memorized without errors, unless another singular event occurs in the same cell. This is why the term "transient fault" will be used to characterise errors generated by these phenomena throughout the rest of this description.

As already mentioned above, the manufacture of onboard electronics on satellites is usually achieved using components insensitive to radiation, either because they are specially made for this purpose or due to the selection of components not specifically manufactured for this purpose.

One first possibility for using commercial components in space on a large scale, is to make a selection by testing commercial components under systematic radiation. This method would firstly be very expensive in terms of selection, but also would not be efficient because it would not necessarily be possible to use large industrial standards, although this would be desirable.

Another economically more attractive possibility would be to reduce constraints on the choice of components. This would consist of finding methods by which phenomena generated by radiation could be tolerated, and particularly transient errors, in other words defining architectures by which errors could be detected and then corrected. Transient faults would then be taken into account at the "architecture" and "system" levels instead of at the "component" level.

Documents reference [4], [5] and [6] describe a set of fault detection, isolation and recovery mechanisms. Some mechanisms are used simply to detect errors, others to detect them and then mask them, and others to correct them. Furthermore, these mechanisms are adapted to the processing of temporary faults, or permanent failures, or both.

A brief reminder of the usual mechanisms is given below, with a few example applications applicable particularly to the space industry:

Avoidance of faults: systematic refreshment of static data before they are actually used; "off-line" self-tests (not during nominal operation) in order to detect a component failure before the component is used.

Error detection or detection/correction codes applicable to memories, communications and possibly the logic, mainly for the manufacture of Application Specific Integrated Circuits (ASICs) or Field Programmable Gate Arrays (FPGA) with integrated control. Error Detection And Correction (EDAC) circuits are systematically used in space for memory purposes. A systematic rereading (or "scrubbing") function of the entire memory is associated with these circuits and runs as a scrub task in order to avoid the accumulation of dormant errors which would eventually make detection/correction impossible.

Duplication and comparison, or triplication and majority vote ("N Modular Redundancy", modular redundancy of order N). These mechanisms can give fail safe architectures when a failure occurs which will not generate a bad command but which will stop at the first fault (duplex), or architectures that remain operational ("fail operational") during a failure, that have the ability to mask a single error in real time and continuing while remaining "safe" (triplex). This class also contains master/controller architectures in which only the microprocessors are duplicated, the data output from the "master" then being verified by the "controller"; the ERC-32 microprocessor made by the MHS S.A. company includes such a mechanism.

- Multiple programming method ("N-version programming") associated with modular redundancy architectures of order N, that are also capable of detecting software design errors. Each computer is provided with a software version that was developed specifically starting from a common specification.
- Time redundancy; the objective is either to use two successive executions followed by a comparison, or a single execution followed by loading a command register and then rereading it in order to make a comparison and a validation, such as the "arm then fire" mechanism used in space for very critical commands, for example triggering pyrotechnic elements.
- Check of the execution time; "watchdogs" (time counters that verify that a program is executed within a limited time) are used in all space computers. Furthermore, these more detailed checks on the execution time may be built into the software; checking the duration of a task, maximum allowable duration to obtain a reply from communication elements, etc. Software is also used to set checks on the task execution time.
- Verification of the control flow, for example checking the sequence of a microprocessor. Watchdogs enable a coarse check—they can detect a hard disk crash. An end of instruction flow check can be made with a more or less complex monitoring processor. A check using the signature analysis is particularly efficient and does not require much electronics. This concept was built into the ERC-32 made by the MHS S.A. company, but a specific compiler that calculates reference signatures and incorporates them into the code was necessary to make it transparent to the user.
- Check the validity of a microprocessor address starting from access rights by page/segment.
- Probability check: this principle is used in Attitude and Orbit Control Systems (SCAO) for satellites, in which data from several types of sensors are compared to detect any inconsistencies, or one item of data is compared with an estimated reference using a prediction filter on the previous values, or one item of data is compared with a predefined range. "Fault tolerance based on algorithmic processing" methods represent a sub-class of probability checks, the verification being based on execution of a second algorithm, for example a reverse algorithm that will reproduce the initial results starting from the results obtained if they are error free.
- Structural or semantic check of data requiring relatively complex data structures.
- Complementary error recovery concepts, mainly restart points for which the mechanisms described above are incapable of correcting faults; regular backup of contexts and restart from the last saved context.
- Another means of error recovery is to reinsert a resource with a fault by transfusion of a healthy context into a defective computer in order to restore the initial detection/correction capability.

Known documents also include descriptions of time redundancy.

Document reference [5] describes the possibility of executing a task three times in sequence and "voting" the result.

The possibility of carrying out an order N modular redundancy type operation by software is also mentioned theoretically in document reference [6].

In this document, another method is described for discriminating transient faults from permanent faults, and possibly for correcting them. Detection is not a time redundancy method, but for example may consist of data coding. If a detection is made, the processing is done a second time; if the second execution gives error-free results, then the error was transient and there is no point in reconfiguring the system; otherwise, a reconfiguration is necessary since it is a permanent fault.

In both documents, time redundancy is measured as being theoretically possible, but no information is provided about the possibility of achieving this in practice, and no specific developments are mentioned. Some problems are not even considered; in particular, should the vote be made by the microprocessor itself or should it be made by an external device independent of the microprocessor. The result of the vote needs to be robust because it is a decision-making element, although a malfunction can occur in the microprocessor, such as data error, crashing of the sequence, etc. Therefore, the vote made by the microprocessor is a major element that is not considered. Furthermore, the granularity on which detection is based is not defined.

Document reference [7] is slightly more specific. It describes a comparative evaluation of two error detection methods. One of them is called the "modular triple software redundancy". The modular triple redundancy is normally performed in hardware. The method evaluated in this publication uses time redundancy by successive execution of the software and all modules, and particularly the vote module, are done by software and are executed on the same microprocessor. Therefore this is a purely software approach. FIG. 1, that corresponds to FIG. 1 in this document, illustrates how detection works; each of three vote modules 1, 2 and 3 compares the results of executing three procedures 4, 5 and 6, and the three modules are followed by a decision making stage 7 that compares the result output from each of the vote modules to check the consistency of the three processing steps. The modular triple software redundancy is programmed on an MC68000 microprocessor. About 1500 errors were injected to validate this software. The memory is not protected from errors by an error detection and correction circuit. This document concludes that the only errors that cannot be detected are errors that will make one processing disturb another. Furthermore, not all errors affecting communications between programs are tolerated.

This document mentions a specific example of an architecture in which the processing is executed three times consecutively (time redundancy), and in which the vote module is executed three times, the results of the vote modules then being voted themselves. It can be seen that the vote is in no way secure, and that is why it has to be triplicated. The final decision is then made by the last stage illustrated in the figure, which is indirectly made secure by the fact that it is necessarily very small (only a few lines of data are necessary to vote three items of data): statistically, singular events directly affecting this module are negligible, but this does not provide security against microprocessor sequencing errors.

Document refers [8] also presents a "triple software modular redundancy" implementation on an iAPX 432 type microprocessor, which is an embodiment similar to that presented in document reference [7]; each software sub-task is executed three times consecutively, and then a software vote module is executed three times, consequently it is not secure since these tasks are carried out asynchronously on the same microprocessor. An error injection phase demonstrated propogations of errors between sub-tasks, which tends to show that there is no barrier to errors between different sub-tasks.

An estimate of the rate of singular events was made for a typical computer for use in space; obviously, this rate depends on assumptions such as the number of memory cells and the value of the sensitivity of a unit cell used. A simulation of the criticality.

Document reference [9 gives a general overview of the processing procedure for the electronic or digital system subject to transient error constraints and mentions spatial redundancy at time redundancy, as processing means.

Document reference [10] also divulges a processing procedure for an electronic system subject to errors, the said system suggesting the use of a single physical sequence in order to avoid the use of redundant sequences. Document reference [11] describes processes applied to recent microprocessors to enable memory management and a virtual memory. An access principle limited to information is considered. Some access rights to a page or a segment are given to each process, these access rights being controlled in real time, of errors on the management of the attitude of a satellite was also made considering a had command generated on a medium critical actuator in an attitude and orbit control system, for example a reaction wheel. It is then found that the singular events rate is low, but not sufficiently low so that this phenomenon can be neglected with regard to two types of controls:

the most critical controls: pyrotechnics, propulsion units, battery management, etc. The risk of losing a satellite several times per year cannot be accepted;

medium critical controls: reaction wheels, magnetocouplers, etc. Some missions, and particularly commercial missions (observation, telecommunications) are not compatible with attitude disturbances that could be generated by these errors, even if these errors remain limited.

Furthermore, the frequency of singular events is very much greater than the frequency of the computer real time cycle.

The purpose of the invention is to propose a processing procedure for an electronic system subject to transient error constraints in order to use commercial components despite their sensitivity to singular events, making it possible to detect the appearance of transient errors and to correct them.

Presentation of the Invention

This invention relates to a processing procedure for an electronic system subject to transient error constraints, for example in the space industry, characterised in that two virtual sequences installed on a single physical sequence are multiplexed in one given real time cycle (the data resulting from each execution of a virtual sequence being stored so that they can be voted before use), and in that if an error is detected, the real time cycle in progress is inhibited and a healthy context is reloaded to make a restart that consists of a nominal execution of the next cycle starting from the reloaded context.

Thus, the error correction is made by reloading a healthy context, in other words the context calculated during the real time cycle that precedes the cycle in which the error was detected, then by nominal execution (in other words repeating new acquisitions) of the cycle that follows the cycle in which the error was detected starting from the restored context; this type of correction is characterised by the appearance of a "hole" in a real time cycle in execution of the software (in which the error was detected).

Advantageously, the following characteristics are also possible.

There are three possible error confinement areas (time, software and hardware); time confinement of errors cannot be propagated from one real time cycle to another; software confinement of errors cannot be propagated from one software task to another or from one virtual sequence to another; hardware confinement of errors prevents errors occurring in the acquisition electronics or in the control unit frame being propagated into the control electronics (no generation of false commands).

A memory plane in the control unit, protected from singular events by an error detection and correction code, can also be used.

The selected detection/correction granularity may also be the operational cycle of software tasks running on the computer, which can very much reduce the constraints added by the "backup context" function that is activated regularly, and the "restore context" function activated at the time of an error correction, compared with usual solutions known to an expert in the subject in that the number of variables belonging to the context is reduced to the strict minimum at the boundary between two real time cycles.

The "backup context" function is activated regularly and may be achieved by an index change, offering the advantage that this function has almost no impact on the development cost of the software or on the execution time of this function by the microprocessor; the only impact is in the use of this function to copy context variables with a life exceeding the detection/correction granularity, i.e. the real time cycle.

The "restore context" function activated during an error correction may be achieved using the fact that the index indicating the context considered to be healthy, in other words error free, in the previous real time cycle must not be swapped, whereas usually (in other words when no error is detected) it would be swapped; this "no swap" is inherent to inhibition of the real time cycle in which the error is detected, thus providing the advantage that this function has no impact on the development cost of the software or on the execution time of this function by the microprocessor, which is not usual in solutions typically known to the expert in the subject.

A segmentation of the memory associated with a specific access rights checking device can be used, this device allowing different and arbitrary segment sizes. This hardware device for checking access rights can enable several access configurations, each configuration allowing access to one or several non-contiguous segments. This hardware device for checking access rights also enables a selection of access configurations according to the logical combinations of one or several keys.

Variables/data to be voted may be spread out flat in order to obtain a simple voting module that can be reused in different applications; in this case, the voting module has a negligible influence on the software development cost.

A software vote for which the integrity is achieved by software checks can be used, particularly including a software monitoring processor and hardware; the vote also triggers authorization of transfers to the control electronics if no errors are detected.

Finally, a check can be made of transfers to the control electronics by a hardware device satisfying M access rights and limiting the validity time of this transfer (time validation window), thus delimiting a hardware error confinement area.

Thus the process according to the invention includes:
Duplication of the execution of tasks in time, and a vote on the tables produced;
Detection of all data errors due to the tables vote;
Detection of sequencing errors due to hardware and software security devices for the vote and the check of access rights;
Correction transparent to the application: everything takes place as if there were a "hole" in a real time cycle.

Minimisation of specific developments is one of the advantages of the process according to the invention, namely:

For software:
grouping of variables voted in tables,
the "Vote and generation of commands" module which is usually reusable in different applications,
management of the process according to the invention (management of time duplication, hardware devices for monitoring of memory accesses and the time validation window, and error correction).

For hardware:
monitoring of memory accesses and the time validation window; these are simple components that have to be integrated into an FPGA circuit, or (better) into the ASIC circuit usually associated with the microprocessor (address decoding, etc.), and they are also reusable in different applications;
protection of the electronics of critical commands by usual fault tolerant mechanisms (for example instrumentation).

Therefore, the process according to the invention has the following advantages:
Very little hardware development,
Very little software development,
Minimisation of recurrent costs (only one computer) compared with other fault tolerant architectures, these characteristics not being frequently found in the fault tolerant applications.

Furthermore, the use of "commercial" components in the space industry has the following main advantages:
It solves the problem of the observed reduction in the availability of "high reliability" components, because the major suppliers no longer supply this market.
Reduction in costs, an aspect stimulated by the budget context. The "high reliability components" item is not negligible in the total development cost of the equipment, and becomes overriding in its recurrent cost.

Use of higher performance functions/components in order to reduce the volume of the electronics and/or increase functionalities.
Reduce the development time of projects to offer more reactive access to space, the procurement time for "high reliability" components typically being one or two years.

Advantageously, the process according to the invention has a generic purpose and may be used in all types of computers subject to transient error constraints regardless of the origin of these errors (cosmic radiation, electromagnetic pulse, etc.), but it is quite naturally applicable to the space field.

This invention also relates to a memory access monitoring device (SAM) in a computer, particularly including a control unit made around a microprocessor, and a memory characterised in that the memory is partitioned into segments and in that each segment has an access right defined by a logical function of all or some of the keys available in the device, the access right to each segment being controlled in real tire. Some segments have authorized access only if there is a very good probability that the microprocessor will be in a good operating condition, thus allowing safe storage of critical data (for example context data).

Advantageously, depending on the programming of available keys in the device, a set of noncontiguous segments is accessible in read only for some segments, and in read/write for other segments.

Advantageously, the size of the segments is arbitrary so that it can be optimised for a given application.

Advantageously, the definition of the set of available keys, the logical functions for combination of these keys and the configuration of segments accessible as a function of the programming of the keys, are specific.

It is also possible to define the specific features of this device related to the specific definition of the keys, for example:

one of the segments has a write authorisation accessible as a function of an exceptional state of the computer, thus allowing safe storage of critical data (for example the code), segments enabling safe storage of critical data are grouped in pairs ("old" segment and "new" segment) (working in flip-flop).

BRIEF DESCRIPTION OF THE DRAWINGS

FIG. 5A illustrates the procedure without using it, and FIG. 5B illustrates the procedure using the process according to the invention.

DETAILED DESCRIPTION OF PARTICULAR EMBODIMENTS

A process according to the invention for a space application is considered as an example throughout the rest of this description.

A typical and generic application of a computer used in space is provided below, considering hardware and software points of view. The reference architecture illustrated in FIG. 2 is used as a basis for the description of the process according to the invention.

Figure 2:
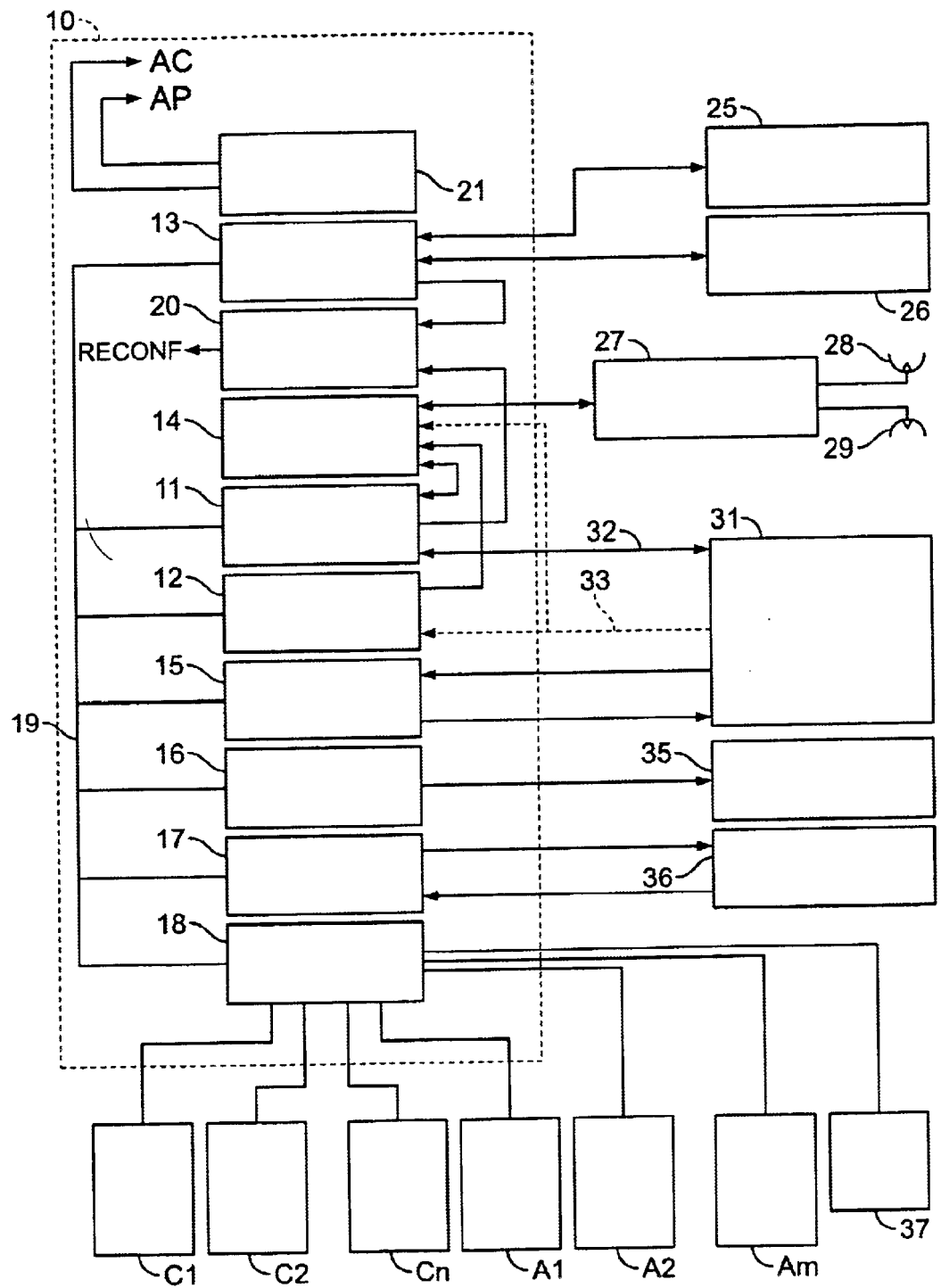
FIG. 2 illustrates the block diagram for the hardware architecture used as a reference in this description.

The onboard management unit 10 illustrated in FIG. 2 comprises:

a control unit 11 made around a microprocessor, a mass memory 12, power interfaces 13, payload interfaces 15, pyrotechnics interfaces 16, thermal interfaces 17, attitude and orbit control system interfaces 18, connected through a data bus 19, a remote control-remote measurement interface 14, monitoring and reconfiguration electronics 20, DC—DC converters 21 producing switched power supplies AC and permanent power supplies AP.

The power interface 13 is connected to a solar generator 25 and to a battery 26.

The remote control-remote measurement interface 14 is connected to a transmitter/receiver, a duplexer 27 connected to antennas 28 and 29.

The payload 31 is connected to the control unit 11 through an avionics bus 32, to the mass memory 12 and to the remote control/remote measurement interface 14 through a high speed serial link 33, to the payload interface 15.

The pyrotechnics interface 16 is connected to deployable systems 35.

The thermal interface 17 is connected to heaters and thermistances 36.

The attitude and orbit control system interface is connected to sensors C1, C2, . . . , Cn, to actuators A1, A2, . . . , Am, and to a reservoir pressure sensor 37.

Therefore, this type of architecture is composed of the different processing modules (control unit module), and input/output modules (acquisition modules, control modules). Input/output modules include low level electronics (analog/digital converter or digital/analog converter, digital or analog channel multiplexers, relays, etc.).

Modules may indifferently be boards connected by a back panel bus, or complete boxes connected through an avionics bus. In both cases, the interface to the bus is made through a master Bus Coupler (CB) onto the control unit module, and by subscriber bus couplers onto the other modules.

Figure 3:
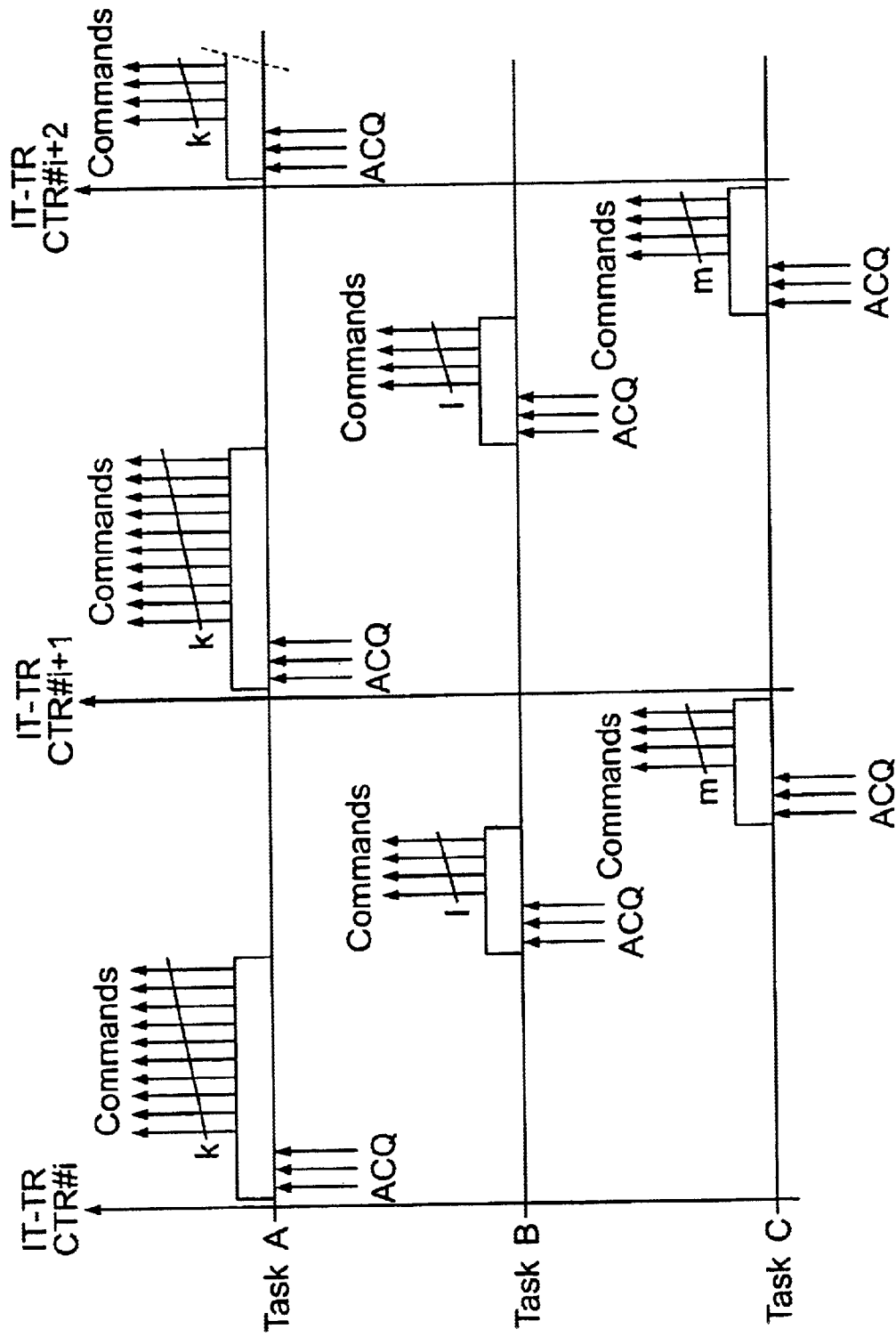
FIG. 3 illustrates the time diagram of the reference software architecture.

The reference software architecture as illustrated in FIG. 3 is composed of processing tasks (for example the attitude and orbit control system task, thermal control task, real time clock task, onboard management task, etc.), each task generating results that must be output from the computer (controls or commands), these results being generated (i.e. output from the computer) as they are calculated. Acquisitions (or Acq) are grouped at the beginning of the real time cycle due to time consistency (for example attitude and orbit control system).

In FIG. 3, tasks A, B and C are shown at the same frequency for clarity of the description.

The activity of these tasks is carried out at a real time cycle rate triggered by a cyclic Real Time Interrupt (IT-TR). This cycle starts some tasks cyclically, and these tasks operate either at the same frequency as the real time cycle, or at a sub-frequency of it. Other tasks are asynchronous and are initialised on events.

Figure 1:
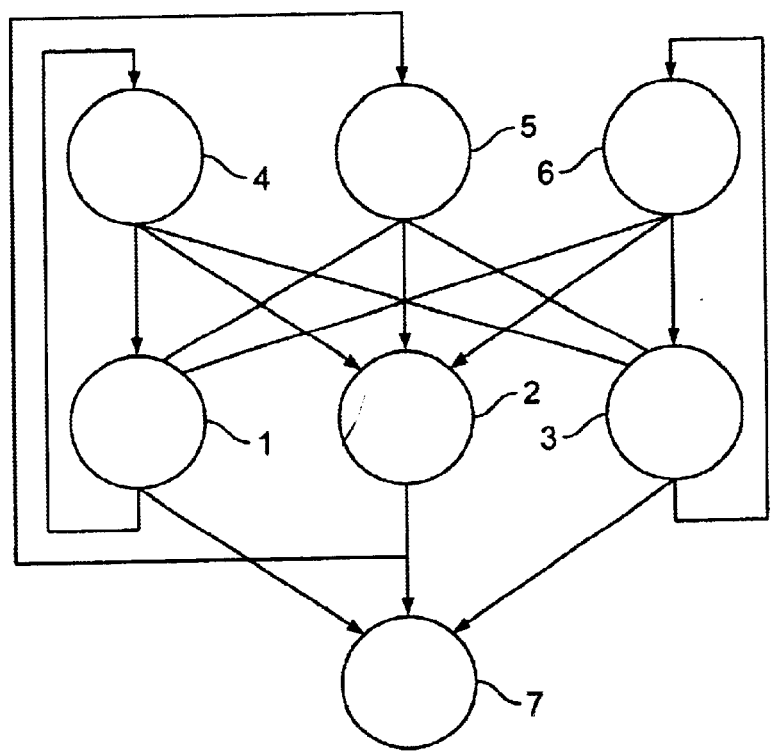
FIG. 1 illustrates a software modular triple redundancy according to known art.
Figure 4:
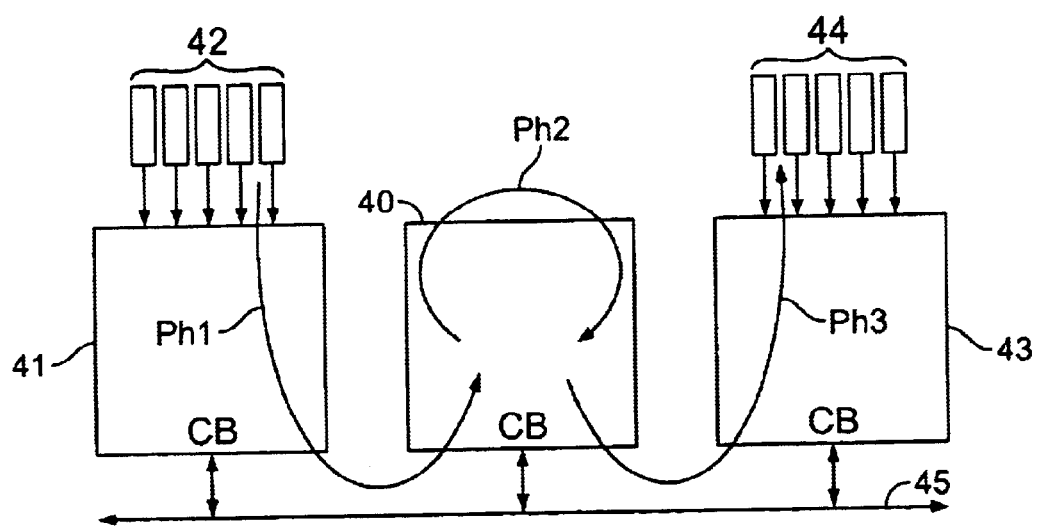
FIG. 4 illustrates the sequencing of the reference architecture.

This representation shows the reference hardware and software architecture and is supplied in FIG. 4. This figure shows the control unit 40, the acquisition electronics 41 connected to sensors 42 and the control electronics 43 connected to actuators 44, these two electronics 41 and 43 and the control unit being connected to data bus 45.

The sequencing of the three main phases Ph1, Ph2 and Ph3 (namely data acquisition, data processing and generation of commands) involves the three separate parts of the electronics 40, 41, 43, with phases Ph2 and Ph3 being nested.

The hardware part of this architecture is based only on functional blocks and therefore ignores the specific nature of particular components and their capacities (if any) in error detection/correction. Therefore the process according to the invention is self-sufficient. However, the use of any fault tolerant mechanisms integrated into the components used for a given application can only improve the error coverage ratio compared with the process according to the invention alone.

Potential error signatures of the reference architecture subject to singular events was determined. The result was that errors could be grouped into two essential classes:

data errors, sequencing errors that may also be shared into subclasses:

"soft crash": incorrect connection, but the microprocessor can come back into phase with the instructions and continue sequencing of instructions more or less erratically;

"hard crash": the microprocessor is no longer operational; for example, the microprocessor is no longer in phase with the instructions, the microprocessor loads data into the instruction register, the stack pointer is disturbed, instruction sequencing is blocked, waiting for an impossible event, infinite loop, et.

These two classes are themselves sub-divided into several sub-classes, the most important concerning address errors.

The distinction between a "soft crash" and a "hard crash" is important: although a hardware device external to the microprocessor is usually necessary to detect "hard crashes" (i.e. a watchdog), a software device may be sufficient to detect a "soft crash" since the microprocessor continues to execute code in the case of a software crash, even if it is erratically.

Furthermore, microprocessor crashes form a critical error class since an "uncontrolled microprocessor" is capable of actions that could have catastrophic consequences for a space mission; therefore it is important to make every attempt to detect them with a short latency time, and/or to produce error confinement areas in order to minimise the probability of bad commands following an undetected error.

We will now describe operation of the process according to the invention itself.

Globally, the granularity used for detection/correction is the basic real time cycle of the computer, for example the cycle of the attitude and orbit control system task in a platform computer.

The objective in the process according to the invention (as in a structural duplex) is to allow the computer to work without being monitored, and then to choose or "vote" only the data that are to be output from the computer (the commands), or the data that are used for correction (the context).

There are several advantages in choosing the real time cycle for the granularity:

this is the frequency at which the acquisition is accessed or at which most sensors/actuators are controlled;
a fairly restricted number of "active" data are available at the end of the real time cycle; there is not a large quantity of intermediate data, and no local variables being used;
for detection, they are stored in a set of tables that are voted,
a simple and well-located restart context is available for correction.

More precisely, the detection/correction granularity for a given task is the frequency of this task, since the vote is made at the end of the task. Consequently, if we consider an attitude and orbit control system task at 10 Hz and a thermal task at 1 Hz, the granularity is 10 Hz for the attitude and orbit control system and 1 Hz for the thermal task. For reasons of clarity, the "granularity by real time cycle" will be used in the rest of the document rather than "by task".

In order to benefit from the efficiency of the duplex (two identical systems in parallel executing the same software with a comparison of the outputs) that is a means of detecting all errors without exceptions regardless of their type (data error, address error, sequencing error, configuration error, etc.) while eliminating structural redundancy, the process according to the invention consists of installing a duplex operation on a single physical channel. In a given real time cycle, two virtual channels located on the same physical channel are multiplexed in time; the data generated from each execution of a virtual channel are stored in "time multiplexed duplex tables" (for example commands, context) so that they can be voted before use.

After a detection, the correction consists of inhibiting the current real time cycle and reloading a healthy context to perform a restart that consists of a nominal execution of the next cycle starting from the reloaded context; everything happens as if there were a "hole" in the real time cycle.

The process according to the invention is based on the fact that an error generated by a singular event is transient; this type of error occurring during execution of the first virtual sequence is not reproduced during execution of the second system (and vice versa). On the other hand, the process according to the invention cannot detect static errors; for example component failures (stuck bit, etc.), or even some errors due to singular events and that would cause a permanent error (for example blocking of a sequencer).

Actions on the output side of the vote module, in other words firstly data transfers to the control electronics (i.e. the data bus) and secondly the control electronics itself, are not protected by the process according to the invention. The user makes a system analysis to determine these critical commands that need to be error-free and to protect them by mechanisms well known to an expert in the subject; coding of data, self-checking circuit, instrumentation of the control electronics, etc.

Figure 6:
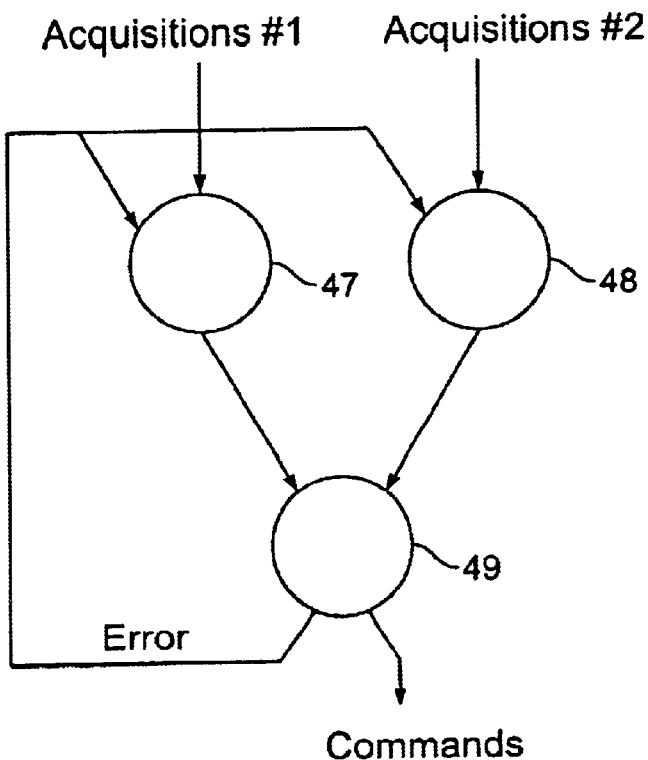
FIG. 6 illustrates a functional description of the process according to the invention.

FIG. 6 contains a functional description of the process according to the invention.

This figure shows the data flows (bold lines) by which the virtual sequence #1 47 receives acquisitions #1, the virtual sequence #2 48 receives acquisitions #2, the secure voter 49 receives outputs from these two sequences 47 and 48 and issues commands. There is also the error signal (thin lines) that connects the secure vote module 49 to the two virtual sequences 47 and 48 in order to make a reload context request in order to initialise a restart for a correction.

Figure 5A:
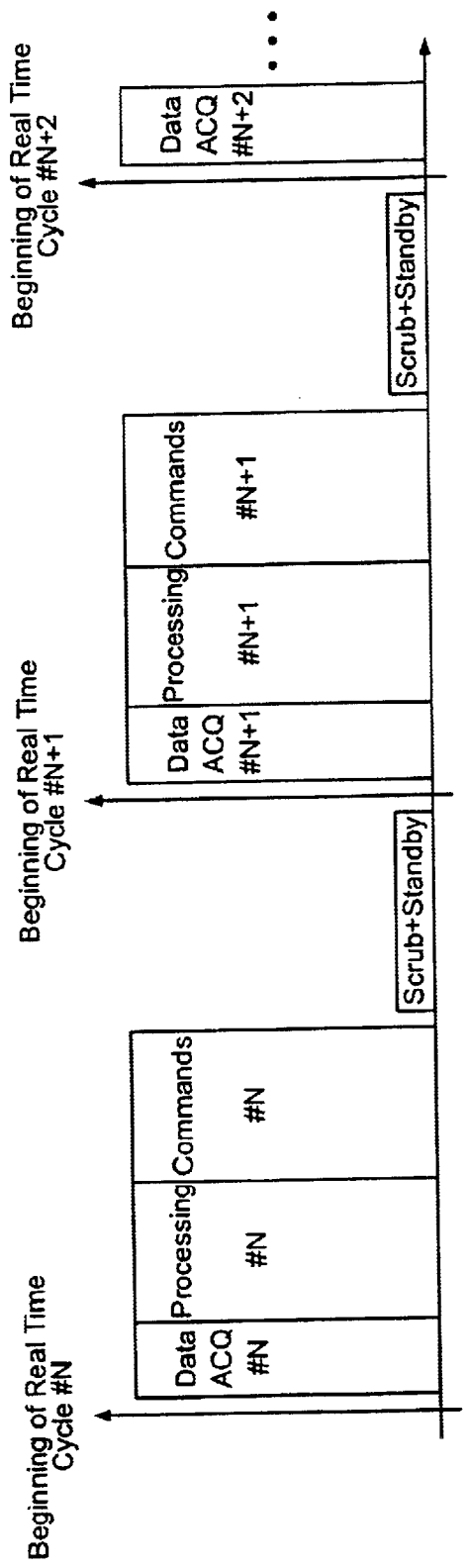
FIGS. 5A and 5B illustrate the global operating sequence.
Figure 5B:
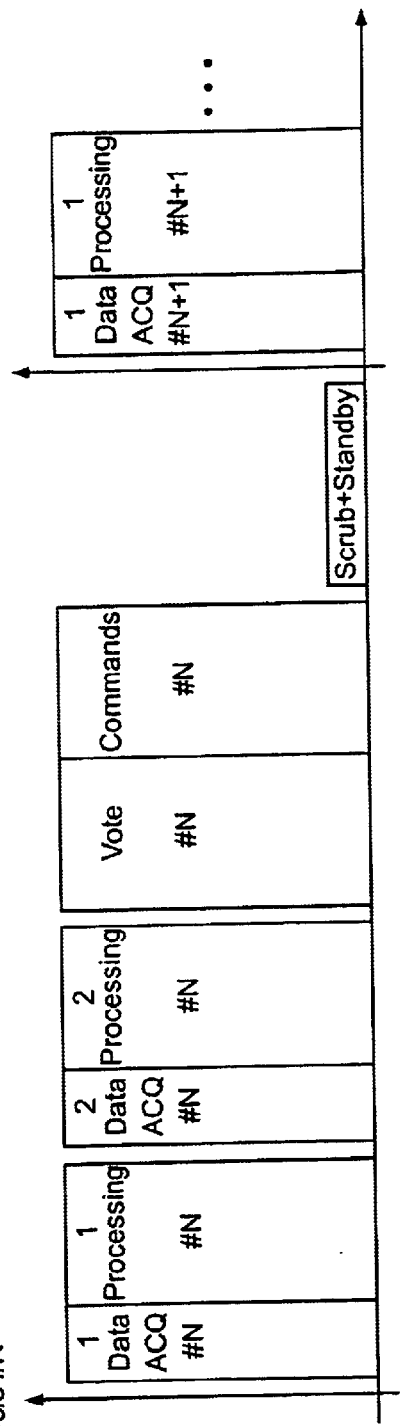

The global sequence of the process according to the invention is illustrated in FIGS. 5A and 5B:

FIG. 5A: sequence without the process according to the invention, the commands nevertheless being grouped at the end of the processing, FIG. 5B: sequence with the process according to the invention.

FIG. 5A illustrates two real time cycles N and N+1, and the beginning of cycle N+2.

Each real time cycle is composed of 4 phases distinct in time:

data acquisition,
processing with calculation of the commands,
transmission of commands,
scrub and standby task, in this case called "Scrub+Standby".

FIG. 5B illustrates the process according to the invention in which each real time cycle is composed of:

acquisition of virtual sequence #1 (ChV #1),
processing of virtual sequence #1; the results being stored in a table TAB #1,
acquisition of virtual sequence #2 (ChV #2),
processing of virtual sequence #2; the results being stored in a table TAB #2,
vote of tables TAB #1 and TAB #2,
generation of commands,
scrub and standby task.

Figure 7:
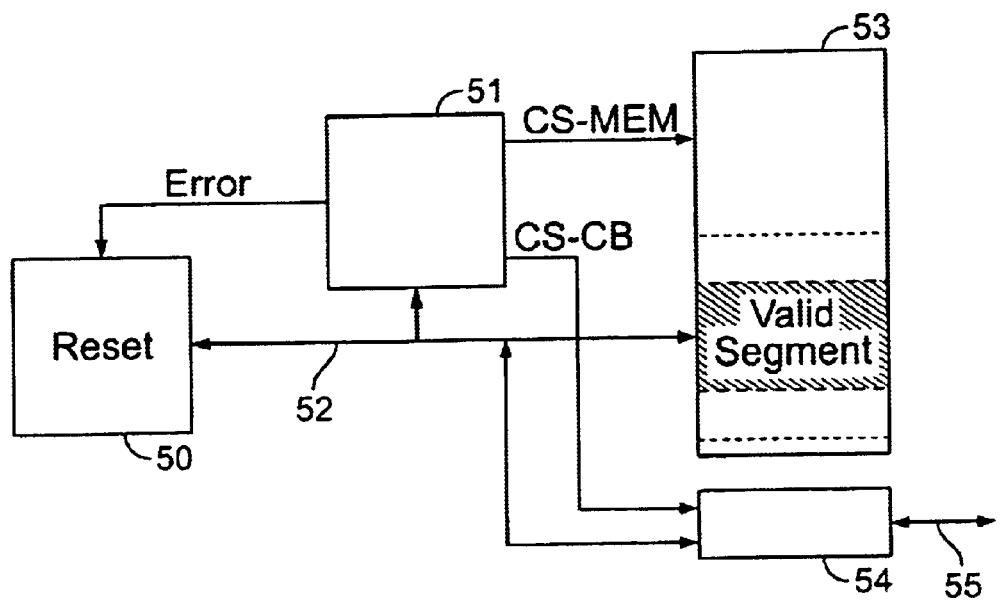
FIG. 7 illustrates the block diagram of the entire process according to the invention.

FIG. 7 illustrates a mimic diagram of the entire fin process according to the invention, presenting all circuits necessary for embodiment of the invention.

A first microprocessor module 50 manages all software mechanisms and in particular:

time duplication of tasks,
putting variables in tables,
the secure vote,
correction by restart,
management of hardware mechanisms.

A memory access monitoring and time validation window module 51 is connected to the bus 52 of the microprocessor 50, an error detection and correction memory 53 and a bus coupler 54.

The module 51 generates an error signal on the "Reset" terminal of the microprocessor 50, a selection signal ("chip-select", CS) on memory 53, and a selection signal on the bus coupler 54.

The memory 53 is shared in segments, each segment having a specific access right (validation by keys). The bus coupler 54 that is connected to a data bus 55 providing access to other computer functions (acquisition electronics, control electronics, etc.) is validated by a "time window" type signal.

The process according to the invention is thus based on the following characteristics:

three error confinement areas (time, software and hardware),
putting variables/data into tables;
time duplication of processing,
a unique secure software vote module enabling error detection by comparison of the results of each processing, the vote module also generating commands, a software monitoring processor that participates in checking the integrity of the vote, a control unit memory plane protected against singular events by error detection and correction code, memory segmentation associated with a hardware access rights control device that, with the previous element, is used to reliably backup the restart context and detect addressing errors, a check of transfers to the control electronics through the data bus, through a hardware device controlling the access right, thus delimiting an error confinement area, correction by restart if an error occurs.

We will now describe each of these characteristics in turn.

Confinement Areas

Figure 8:
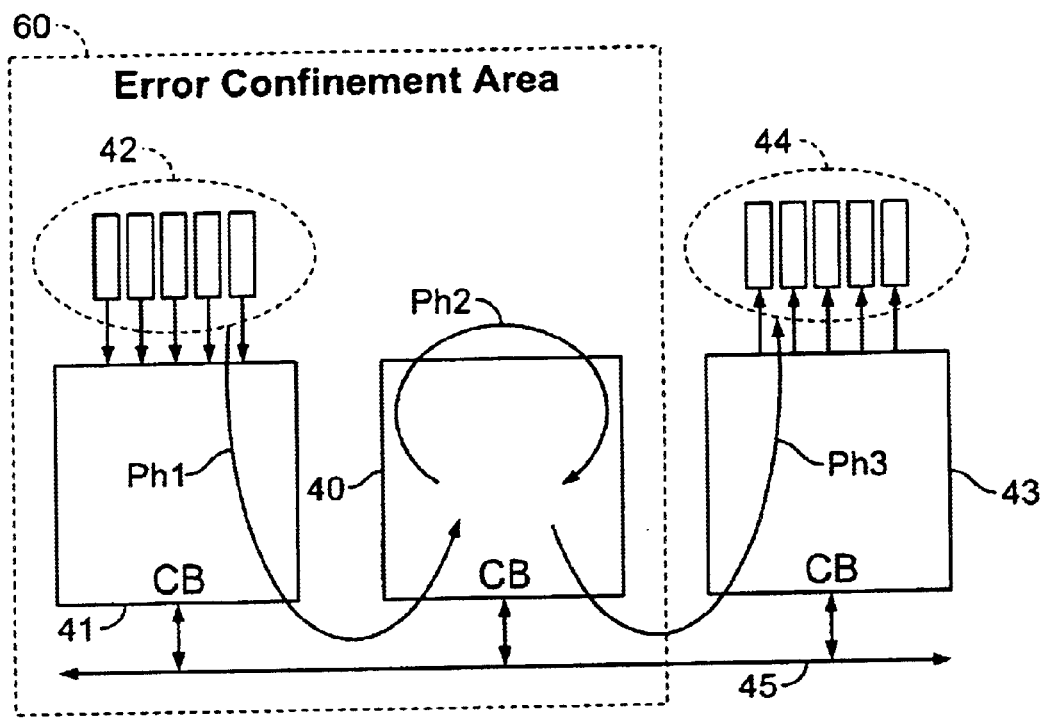
FIG. 8 illustrates the error confinement area at hardware level.

The largest error confinement area 60 is composed of acquisition electronics 41 and the control unit 40 as illustrated in FIG. 8; this figure uses the same references as FIG. 4. Thus, if an error disturbs acquisitions or processing, this error cannot be passed onto the control electronics 43. Therefore errors occurring subsequent to a singular event in the acquisition electronics 41 or in the control unit 40 will not generate any bad satellite commands and will not disturb the mission.

This confinement area 60, due to the vote, is effective for errors that the vote module is capable of detecting. This confinement area is also almost impervious to other errors, due to the presence of an access rights check; the hardware device in the time validation window blocks unauthorized generation of commands on the bus.

Furthermore, other confinement areas are defined in the process according to the invention:

time confinement of errors by real time cycle since the correction is based on the granularity of a real time cycle, confinement of errors by software task due to the memory access monitoring device, and by virtual sequences also due to monitoring of memory accesses.

Process Tables

Operation of the process according to the invention is based on a set of tables which, in particular, contain data to be voted (therefore these tables are duplicated, one set being managed by ChV #1, the other set being managed by Chv #2). These tables are called "time multiplexed duplex tables" since they are specific to duplex operations, unlike usual software tables. For example:

acquisition table (TAB-Acq), control table (TAB-Cde), context table (TAB-Ctxt).

Each of the context tables TAB-Ctxt #1 and #2 is actually composed of a set of two tables that work by swapping over one cycle out of every two at the end of the task (i.e. at the end of the vote) to enable restoring the context when making a correction by restart. A set of two indexes (the "Old" and the "New") are stored in memory and are associated with them.

Thus for example for virtual sequence 1, during cycle #N in task K, the first table may be considered as "New" and is denoted TAB-Ctxt-New #1, the second table is "Old" "Old" and is denoted TAB-Ctxt-Old #1. If the vote for task K does not detect any errors, the swap inverts the roles at the end of the vote; the first table then becomes TAB-Ctxt-Old #1, and the second table becomes TAB-Ctxt-New #1.

The "Old" areas are prohibited in write due to the memory access monitoring device, for example to protect the restart context from a microprocessor crash once it has been voted and judged to be sound.

Sequencing—Time Duplication

Compared with the reference software architecture defined above, the process according to the invention imposes that commands are not generated as they are calculated as shown in FIG. 3, but rather that they should be stored in a table waiting for a vote (see FIG. 5B). When the processing is terminated for the two virtual sequences, the tables are voted and the vote module generates the commands only if no inconsistencies are detected; in this case, one of the two command tables is sent to the control unit 40 through the control electronic 43 through the bus 45.

For a given task, the global sequence of the process according to the invention, including the time duplication aspect, is described below with reference to FIG. 9.

This figure illustrates the sequence of the time multiplexed duplex according to the invention, and the swap of the context tables.

Real time cycles are initialised by real time interrupts IT-TR.

Each real time cycle is composed of the following phases:

sequencer/real time executive (ETR), task A, sequencer/real time executive, task B, sequencer/real time executive, task C, sequencer/real time executive, scrub and standby task.

Task A, and tasks B and C, consist of the following as illustrated in FIG. 5B:

virtual sequence number 1 acquisition, virtual sequence number 1 processing, virtual sequence number 2 acquisition, virtual sequence number 2 processing, vote and generation of commands.

There are the following steps:

During the "processing" module for virtual sequence No. 1 (ChV#1):

acquisition of data for ChV#1 and storage in TAB-Acq#11;

execution of the processing associated with ChV#1 starting from TAB-Acq#1 and TAB-Ctxt-Old#1; the results of this processing are stored in the TAB-Cde#1 and TAB-Ctxt-New#1 tables; no command is generated by the control unit to be sent to actuators.

During the "processing" module for virtual sequence number 2 (ChV#2):

acquisition of data for ChV#2 and storage in execution of the processing associated with ChV#2 starting from TAB-Acq#2 and TAB-Ctxt-Old#2; the results of this processing are stored in the TAB-Cde#2 and TAB-Ctxt-New#2 tables; the computer does not generate any output.

During the "Vote and generate commands" module, in other words the comparison of tables and execution of actions related to the tables:

word by word comparison of TAB-Cde#1 and TABCde#2, word by word comparison of TAB-Ctxt-New No. 1 and No. 2, if no errors are detected, the process continues; otherwise, put on standby, swap the context tables by changing the index: TAB-Ctxt-New replaces TAB-Ctxt-Old and is used as the context for the next real time cycle, generate commands: one of the two TAB-Cde tables is emptied sequentially to transfer command requests to the command electronics through the data bus, initialisation of time multiplexed duplex parameters (time multiplexed duplex tables, time multiplexed duplex management variables).

Figure 9:
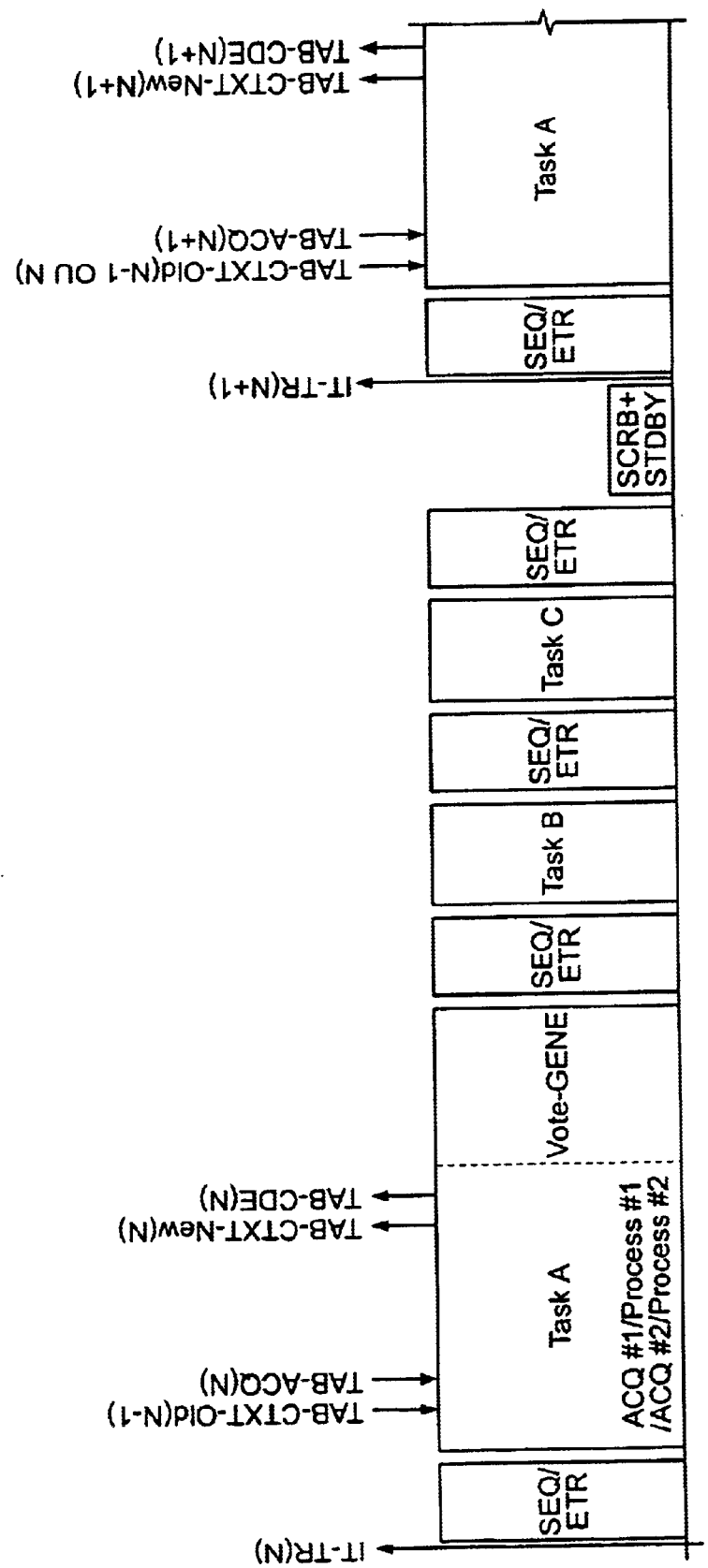
FIG. 9 illustrates the sequence of the process according to the invention and swapping of the context tables.

Thus in FIG. 9, during the real time cycle N+1, if no errors were detected during the real time cycle N, the entry context to task A is TAB-Ctxt-Old(N), this table actually containing the data from TAB-Ctxt-New(N) due to the swap; if errors were detected, the entry context to task A is TAB-Ctxt-Old (N−1), this table being identical to table TAB-Ctxt-Old(N−1) in the real time cycle N since context switching does not take place in the case of an error.

During processing modules, a checksum code is calculated for each of the tables that will be submitted to the vote; it participates in checking the exhaustiveness (integrity) of the vote.

Secure Software Vote

Figure 10:
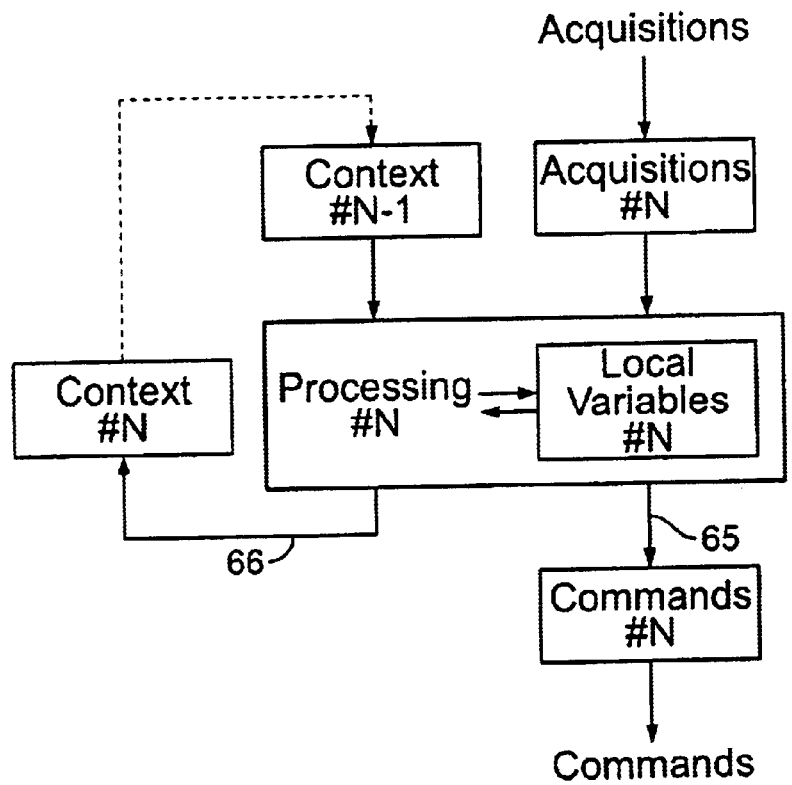
FIG. 10 illustrates the vote on the data.

As a minimum, the data that need to be voted are the various outputs from the processing module as illustrated in FIG. 10, namely:

data 65 output from the computer (the commands) to not generate incorrect actuations, data 66 used for the restart (context—if cycle N is in fault, the healthy data N-1 will be restored for the restart), since the restart context needs to be healthy.

Thus, all data output from the processing module are voted. The vote associated with the given task is made at the end of this task, as defined by the detection/correction granularity.

Concerning the vote module, the process according to the invention can give the following characteristics:

No need to use an external component tolerant to singular events if the vote security devices can be defined; the architecture is thus simplified; the vote can be made by the microprocessor itself entirely in software, with support from the few hardware devices necessary elsewhere in the process according to the invention.

The software vote is not duplicated.

The process according to the invention is based on the best use of the detection capacities of the duplex architecture, in other words capable of detecting all error types including sequencing errors that are the most difficult to detect and also potentially have the most serious consequences. These errors have an impact on the consistency of time multiplexed duplex tables; therefore, they are detected by a software vote provided that the software vote is secure, in other words that it cannot be triggered by a microprocessor operating incorrectly. Therefore, appropriate devices must be provided to ensure that the vote is correct.

Two central elements are provided to ensure that the vote is secure:

check that the microprocessor and the control unit module are in healthy state at the beginning of the vote, check that the vote is complete while the vote is being made, in order to authorise generation of commands.

Figure 11A:
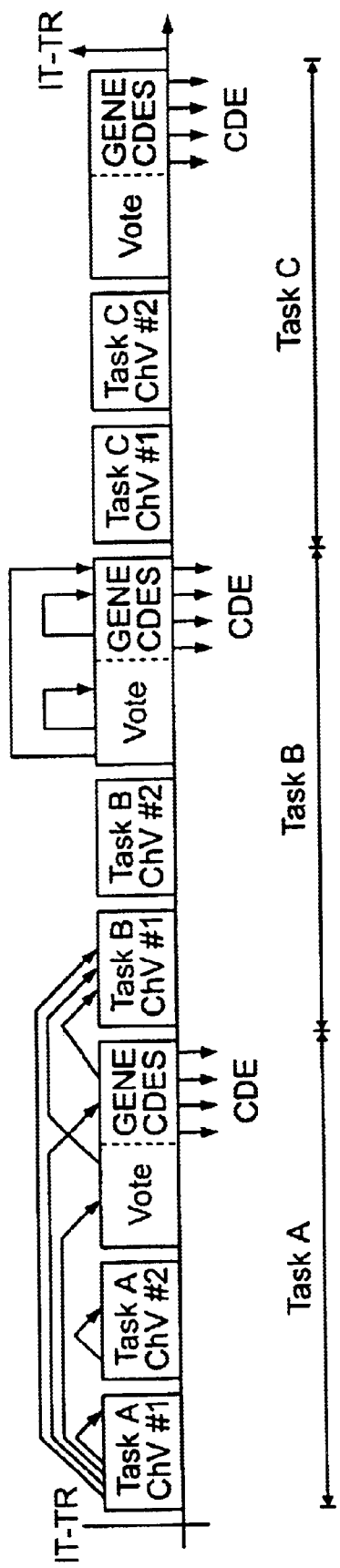
FIGS. 11A and 11B illustrate the structure of the vote for the process according to the invention, including the different "soft crash" type sequencing errors and the structure of the vote/command generation procedure.

The vote structure is defined as a function of the analysis of the possibilities of bad connections of a microprocessor affected by a "soft" crash; FIG. 11A illustrates the various possible "soft crash" type sequencing errors.

"Hard crashes" are handled by a watchdog, which is the method usually used by an expert in the subject.

Figure 11B:
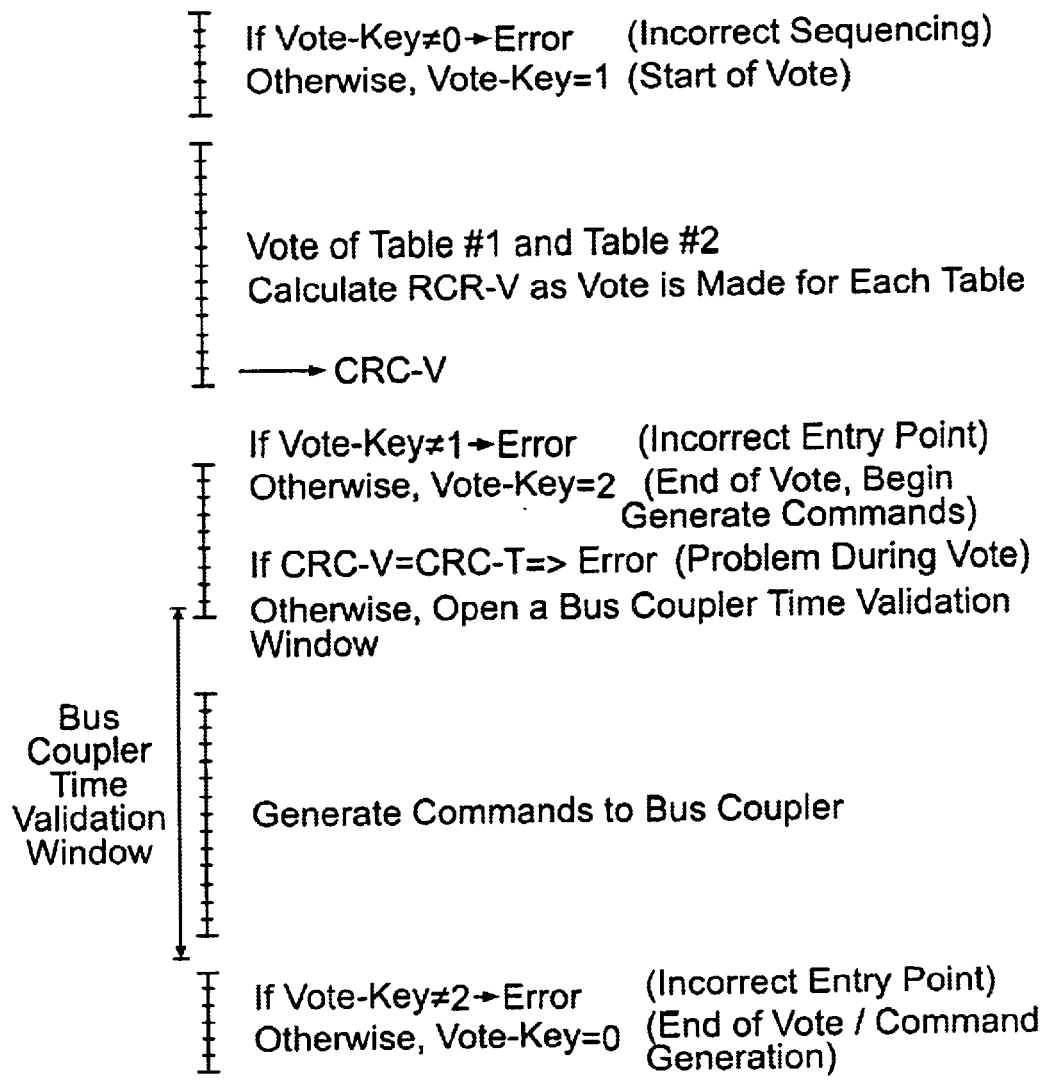

The following structure is used for the "Software vote and generate commands" module associated with task K, and is illustrated in FIG. 11B:

a) check the state of the microprocessor connected at the beginning of the vote and the state of the control unit module: check that the stack pointer is within the authorized area, check the microprocessor and the control unit card/board configuration registers;

b) inhibit caches if possible to minimise the probability of an error during the vote;

c) check that a Vote-Key variable is equal to 0, and then set it to 1 (i.e. vote); this variable is a key that is used to globally check correct sequencing of the microprocessor using a Software Monitoring process;

d) activate the key for the memory access monitoring device indicating that voting is being done and authorizing simultaneous access to the two memory areas ChV#1 and ChV#2;

e) vote on all tables produced by the time multiplexed duplex and calculate a cyclic redundancy code calculated during the CRC-V votes, as the vote is made, for each table: TAB-Cde, TAB-Ctxt-New;

f) check that Vote-Key is equal to 1, then set it to 2 (i.e. generate commands);

g) compare CRC-V with the cyclic redundant codes calculated during CRC-T processing;

h) inhibit the memory access monitoring device key indicating that a vote is being made;

i) if the results of tests e, f and g are correct, then open a bus coupler time validation window using the time validation window system;

j) reinitialise the command card configuration registers;

k) generate commands to the bus coupler;

l) check command card configuration registers, and take action as a function of the error type detected (usually resend the command);

the time window is terminated, or will terminate;

m) check that Vote-Key is equal to 2, then set it to 3 (i.e. switching and initialisation);

n) Swap the context tables for task K by inverting the pair of "Old" and "New" indexes stored in memory;

o) initialise all tables in task K apart from the "Old", tables, with 1's complement values between ChV#1 and ChV#2;

p) transfer "Old" tables to "New" tables and vote to check this transfer; this transfer is necessary to make sure that the variables are valid in the long term, if they are not systematically updated each time that the task is executed;

q) check that Vote-Key is equal to 3, then set to 0 (i.e. inhibited);

r) validate caches.

The "vote/generate commands/switch/initialise time multiplexed duplex tables" procedure cannot be interrupted, i.e. it must not be stopped by a higher priority task (it must be terminated once it has been initialised). However, an interrupt can temporarily interrupt this module.

Software Monitoring Processor

A Software Monitoring Process known to an expert in the subject is a means of handing over control of the correct sequence of microprocessor instructions to the software itself. The software is broken down into linear elementary segments, in other words segments between two connections. Since linear segments do not themselves contain branching instructions, once the microprocessor has executed the first instruction in this segment, it must continue until the last instruction in this segment has been executed.

It is checked that the microprocessor has actually entered a linear segment at its exact entry point and not elsewhere, by testing a key at its entry point and checking it at its exit point.

The vote security uses a number of means including this Software Monitoring process; the "Vote-Key" software variable being a key associated with this process. This vote module is partitioned into three functional segments (vote, generate commands, switching and initialisation), in a way the rest of the application software representing a fourth segment:

- the value of the Software Monitoring process key is checked at the beginning of each segment, to make sure that the microprocessor actually exited from the previous segment exactly at its exit point and not elsewhere, and it is also checked that the segments are correctly chained in sequence with each other,
- then, the Software Monitoring process key is set to a value corresponding to the current segment immediately after this check at the beginning of the segment,
- at the end of each segment, it is checked that the microprocessor actually entered the current segment at its exact entry point and not elsewhere.

A Protection of the Memory Plane

Memory planes are conventionally protected against singular events by a correction code (EDAC) and a scrub task to read the entire memory plane to detect and correct dormant errors. This is necessary because multiple errors on the same word can no longer be detected and/or corrected.

The process according to the invention is based on:
- a reliable memory related to singular events due to the use of a correction code (EDAC);
- a reliable memory for incorrect writes following an address error, an instruction error, a microprocessor crash, etc., by monitoring access rights.

Memory Access Monitoring Device

The Memory Access Monitoring (SAM) device is a hardware device derived from conventional block memory protection units. It is used to check that a microprocessor that attempts to access a delimited memory area actually has access rights to this area.

The memory access monitoring device can detect most address errors. In particular, it can very quickly detect many microprocessor crashes. A microprocessor can frequently go outside the allowable address area after a "soft" crash.

The memory access monitoring device has some special features compared with a conventional block memory protection unit:
- the size of the segments is arbitrary, and is defined as a function of the applications,
- the access authorisation is made by programming keys memorised in registers internal to the memory access monitoring device, the definition and combination of these keys being specific to the process according to the invention.

The following is a list of keys integrated in the memory access monitoring device:

Key preventing write access to the area memorising the code, since a code error would be an error mode common to the two virtual sequences and would not be detected by the vote. This key authorises writing to memory only during initialisation of the computer, when the code in read only memory is transferred into RAM.

Key indicating which virtual sequence is current, ChV#1 or ChV#2, and preventing the microprocessor from accessing the memory area containing the ChV#2 tables when ChV#1 is being executed (and vice versa). This key enables one virtual sequence to be made impervious to errors occurring on the other.

Key indicating that a vote is currently being made; when this key is active, it exceptionally enables the microprocessor to simultaneously access the two areas ChV#1 and #2 so that the vote can be made.

Key indicating which is the current task, and allowing the microprocessor to access only the memory area containing the tables for this software task currently being executed. This key enables one task to be made impervious to errors occurring in the other tasks.

Key indicating which of the two "Old"/"New" table sets working in swap are the "Old" areas and the "New" areas, write being prohibited in the "Old" areas.

Time Validation Window System

The Time Validation Window (FVT) system is an innovative hardware device. It is made using a conventional time counter. It confines hardware errors. It is designed to:

- prevent the crashed microprocessor that would execute the command electronics management code, from generating a command without having correctly acknowledged an access right;
- prohibit a microprocessor that would execute an incorrect "write to address corresponding to a command", type instruction from accidentally generating a command.

Therefore, the time validation window device protects the system from accidental commands, with potentially catastrophic consequences that they could have for the application. It is armed in advance to authorise access to the controlled electronics; a time access validation window is opened.

In the case of errors mentioned above, the microprocessor does not access the command electronics by executing the interface procedure exhaustively; consequently, unauthorised access is immediately detected by this system since the microprocessor has not previously opened the time validation window.

The time validation window device is armed after having made the decision that there are no errors present. This decision is based firstly on checking the healthy state of the microprocessor and the control unit (at the beginning of the vote, then with the "Vote-Key" variable and the "Checksum" during the vote), and secondly on the result of the vote.

Correction

The correction is executed according to the following sequence:

- when an error is detected, the current real time cycle (number N) is inhibited and no command is generated; the microprocessor goes to standby mode while waiting for the next real time cycle,
- the next real time cycle N+1 is executed from the previous context N−1, and not from context N which is no longer reliable, and from acquisitions for the current cycle N+1.

The incorrect real time cycle is not replayed, all that is done is to inhibit the current real time cycle and restore the context of the previous cycle. If an error occurs, the microprocessor does not generate commands for the current real time cycle since it is put on standby; everything happens as if there were a "hole" in the real time cycle.

The correction does not require any specific actions; the microprocessor is put on standby after a detection, consequently it does not continue execution of the vote module. This naturally prevents swapping of the "Old" and "New" contexts, which takes place at the end of the vote module.

Given the transient nature of errors detected by the process, a single restart attempt is made. If this attempt is not successful, the computer would have to be completely reinitialised.

Sequencer—Real Time Executive

The sequencer, or the real time executive, that enables sequencing of software tasks, is not directly protected. The objective is to use a commercially-available executive, and therefore not to make any changes in it to include fault tolerant mechanisms.

On the other hand, the execution time dedicated to these tasks compared with the total execution time is very small. Consequently, task scheduling errors are modes common to the two virtual sequences and are non-detectable, but have a very small impact on the coverage ratio.

Furthermore, confinement areas are capable of blocking some undetected errors before a bad command is initialised, thus reducing the impact of errors originating from the scheduler.

Variant Embodiments

Variants to the process according to the invention are possible, particularly by simplifying some of its characteristics, for example.

Simplification of vote security mechanisms: elimination of the checksum calculation, the check by the software monitoring process being considered to be sufficient.

Simplification of the memory access monitoring device: no impervious partitions between ChV#1 and ChV#2 (elimination of the key indicating the current virtual sequence), since the probability of identical errors between two sequences is a priori very small.

Development and Embodiment of the Process According to the Invention

The process according to the invention was developed in order to make the most generic and the most exhaustive possible validation, and to measure the maximum possible error coverage rate.

Objective

The objective is to have a hardware and software embodiment (mock-up) representative of a typical space application, in order to validate the process once and for all. A space project actually analyses the various possible solutions in the preliminary phases. For new solutions, a mock-up is used in an attempt to demonstrate correct operation and suitability to the need, which creates significant delays before the project team can make a decision about its use.

Consequently, before this phase, a generic validation is undertaken in order to provide a complete file to any interested project, including requirement specifications, implementation specifications, implementation files, validation results, results of recovery rate measurements, etc.

Thus in the preliminary phase, all projects can have the complete development, validation file for this process without the need to redevelop a mock-up. Consequently (for example through an audit) the suitability of the process to satisfy the needs of the project can be determined quickly to make a decision about its selection.

Validation Method

The process is validated by the injection of faults. There are thus two types of injection with separate objectives.

In the first phase, deterministic errors are injected by software. Since this injection is synchronous, error scenarios can be replayed when the process is in fault. This phase can thus be used to validate the process, and possibly to modify it to improve its error detection/correction performances.

In a second phase, random errors are injected by applying a particle beam to the main components of the embodiment (heavy ions, protons), by using an particle accelerator. This phase is complementary to the previous phase, and enables an end to end validation since the injected error spectrum is wider. Furthermore, since the distribution of errors is representative of a real application environment, it can make an accurate measurement of the error coverage ratio of the process.

Hardware Embodiment

The developed hardware embodiment is composed mainly of three parts; the processing unit, the acquisition unit and the observability unit.

The processing unit is developed around a Power PC 603e type microprocessor and its memory, and a programmable component integrating all hardware mechanisms of the process.

The acquisition unit simulates several acquisition channels for the microprocessor, each of these channels having particular characteristics: acquisitions made at the request of the microprocessor (simulation of simple sensors), acquisitions made cyclically and that the microprocessor must read when they arrive (simulation of intelligent sensors such as a stellar sensor or a GPS), reception of remote commands, etc. These acquisition channels are made around nano controllers of the PIC 16C73A type.

The observability unit integrates the control-instrumentation of the embodiment (load the software, observability of the microprocessor, etc.), and a channel enabling simulation of actuations made by the microprocessor. Outputs on this channel are systematically checked to verify that there are no false actuations generated by the computer, despite the fact that it is affected by transient errors.

Software Embodiment

The developed software application (i.e. the software embodiment) has the following features to make it as representative as possible of onboard real time applications, in space or in other applications:

sequencing based on a cyclic sequencer that will later be replaced by a commercial real time executive;

several main application tasks (for example six) with different priorities, some of them being cyclic and other asynchronous and aperiodic; one of the tasks being the core of a spacecraft attitude control program;

the application is based on real time cycles running under the control of a real time clock, the application tasks having different intervals;

several application tasks, for example three, are interrupted by higher priority tasks;

the software must react in real time to external asynchronous events originating from the acquisition channels.

REFERENCES

[1] "La transition vers les pratiques commerciales en composants électroniques: un voie d'innovation majeure" (Transition to commercial practices in electronic components: a major line of innovation) by P. Lay, P. Bezerra, P. Castillan, J-P. Fortea, R. Laulheret, and M. Barré, (Small satellite Systems and Services, International conference, Jun. 24–28, 1996, Annecy, France).

[2] "L'environnement radiatif spatial" (the Space Radiation Environment) by J. C. Boudenot, (L'Onde électrique, May–June 1991, Vol. 71, No. 3, p. 62–68)

[3] "Effet des radiations sur les composants électroniques" (Effect of radiation on electronic components) by R. Ecoffet, (module IV, §5.4, p. 493–513, in the CNES "Techniques and technologies for spacecraft" course, Cépadubs-Editions, 1998).

[4] "Operation of commercially-based microcomputer technology in a space radiation environment" by J. N. Yelverton, (AIAA Computing in Aerospace Conference, 9th San Diego, Calif., Oct. 19–21 1993, pages 192–201, reference AIAA-93-4493-CP).

[5] "The theory and practice of reliable system design", by D. P. Siewiorek, and R. S. Swarz, (Digital Press, ISBN 0-932376-13-4, 1982, Chapter 3, p. 118–119).

[6] "Design and analysis of fault tolerant digital systems" by B. W. Johnson, (Addition-Wesley, ISBN 0201-07570-9, chapter 3.6, p. 134–136, 1988).

[7] "Experimental evaluation of two concurrent error detection schemes" by M. A. Schuette, J. P. Shen, D. P. Siewiorek, and Y. X. Zhu (Fault Tolerant Computing Symposium, 1986, p. 138–143).

[8] "Fault recovery of triplicated software on the IAPX 432" by X. Z. Yang, and G. York, (Distributed Computing System, May 1985, p. 438–443).

[9] "Transient fault tolerance in digital systems" by Janusz Sosnowski (IEE Micro, Vol. 14, No. 1, Feb. 1, 1994 (1994/02/01), pages 24–35, XP000433306).

[10] EP-A-0 133 004

[11] "A survey of microprocessor architectures for memory management" by Furth B et al. (Computer, US, IEEE Computer Society, Long Beach, Calif., US, Vol. 20, No. 3, page 48–67 XP002034222 ISSN: 0018–9162).

What is claimed is:

1. Processing procedure for an electronic system subject to transient error constraints, comprising:

multiplexing in time a first and second virtual channels located on a single physical channel for each real time cycle, said real time cycle including an operational cycle of a software task that is executed periodically and continuously, storing the data resulting from each execution of a virtual channel, voting these resulting data before using them when the two virtual channels are completed, in order to be able to detect the presence of an error, canceling the real time cycle in progress in case an error is detected, reloading a healthy context issued from the previous cycle in case an error is detected, restarting in case an error is detected, that consists of executing the nominal next cycle starting from the reloaded context.

2. Process according to claim 1, in which three error confinement areas (time, software and hardware) are used.

3. Process according to claim 1, in which a memory plane in the control unit is used, protected from singular events by an error detection and correction code.

4. Process according to claim 1, in which the detection/correction granularity used is the real time cycle for the software tasks being performed on the computer.

5. Process according to claim 1, in which the "backup context" function activated regularly is achieved by means of an index change.

6. Process according to claim 1, in which the "restore context" function activated during an error correction is performed due to the fact that the index indicating the context considered to be error free, after the previous operational cycle has not changed, even though is it has usually swapped, in other words no errors are detected; this "no swap" being inherent to inhibition of the real time cycle in which the error is detected.

7. Process according to claim 1, in which segmentation of the memory is associated with a hardware device to check access rights.

8. Process according to claim 7, in which the hardware device to check access rights enables several access configurations, each configuration allowing access to one or several non-contiguous segments.

9. Process according to claim 7, in which the hardware device to check access rights is used to select several access configurations with logical combinations of one or several keys.

10. Process according to claim 1, in which the data to be voted are put into a table.

11. Process according to claim 1, in which a software vote is used for which integrity is achieved by software checks, particularly including a software and hardware monitoring processor.

12. Process according to claim 1, wherein a hardware device checks access rights and limits the validity of this transfer in time, thus delimiting a hardware error confinement area.

13. Process according to claim 1, used in space applications.

14. System for monitoring memory accesses in a computer comprising:

a memory, the memory being partitioned into segments, each segment having an access right, a device in which registers allow to store access keys and all or some of the keys available in the device being combined using a logical function to define access right to each segment, these access rights being checked in real time, and in which access for some segments will only be authorized if there is a very strong probability that the microprocessor will be in a good operating state, thus enabling safe storage of critical data, wherein said access keys comprises a task number key, a virtual channel number key, and a vote key.

15. Device according to claim 14, in which a set of non-contiguous segments is accessible, in read only for some segments and in read/write for other segments, depending on the programming of the keys present in the device.

16. Device according to claim 14, in which the segment size is arbitrary, so that it can be optimized for a given application.

17. Device according to claim 14, in which definitions of the set of available keys, the logical combination functions for these keys and the configuration of the accessible segments as a function of the programming of the keys, are specific.

18. Device according to claim 14, in which one of the segments has a write authorization accessible in an exceptional state of the computer, thus enabling safe storage of critical data.

19. Device according to claim 14, in which segments enabling safe storage of critical data are grouped by pair, working in flip-flop.

* * * * *